United States Patent Office 3,563,992
Patented Feb. 16, 1971

3,563,992
1,4-DIAZA-BICYCLO[4,3,0]NONANE-2,5,9-TRIONES
Michael R. Harnden, Waukegan, Ill., assignor to Abbott Laboratories, North Chicago, Ill., a corporation of Illinois
No Drawing. Continuation-in-part of application Ser. No. 593,691, Nov. 14, 1966. This application Oct. 31, 1967, Ser. No. 679,524
Int. Cl. C07d 51/72
U.S. Cl. 260—268
9 Claims

ABSTRACT OF THE DISCLOSURE

Novel 1,4-diaza-bicyclo [4,3,0] nonane-2,5,9-triones are obtained by two synthetic routes. The first involves cyclization of α-aminoalkanoyl-glutamic acids to 3,6-dioxo-2-piperazine-propionic acids which undergo a second cyclization upon refluxing with acid anhydride. In the second route, compounds of the novel bicyclic system were obtained by direct cyclization of N-acetyl-α-aminoalkanoyl-glutamic acid. These compounds have been found effective as central nervous system stimulants and depressants.

DESCRIPTION OF INVENTION

This invention relates to certain novel compositions of matter useful as substances for effecting a response in the central nervous system, and is a continuation-in-part of application Ser. No. 593,691 filed Nov. 14, 1966, now abandoned. More particularly this invention pertains to 1,4-diaza-bicyclo [4,3,0] nonane-2,5,9-triones which exert depressant and stimulative effects in mammals.

This invention further involves methods for the preparation of these carbonyl compounds and certain intermediates prepared in the synthesis of such end products.

In its primary aspects, this invention therefore concerns a series or class of novel 1,4-diaza-bicyclo [4,3,0] nonane-2,5,9-triones that generally may be represented by the following structural formula:

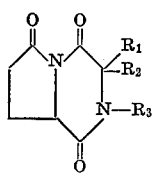

wherein $R_1$ represents hydrogen, methyl, ethyl, propyl, isopropyl, n-butyl, benzyl, monoloweralkoxybenzyl, diloweralkoxybenzyl, triloweralkoxybenzyl and 3,4-cyclomethylenedioxybenzyl; $R_2$ represents hydrogen, methyl, ethyl, propyl, isopropyl, and n-butyl; and $R_3$ represents hydrogen and loweralkanoyl. In this specification the prefix "lower" preceding a term defining a functional group is intended to modify the definition of that functional group to specifically include those functional groups that have from 1–4 carbon atoms.

The compounds of the present invention can variously be prepared by two preferred reaction methods, scheme A and scheme B. The first method, scheme A, employs the following procedure.

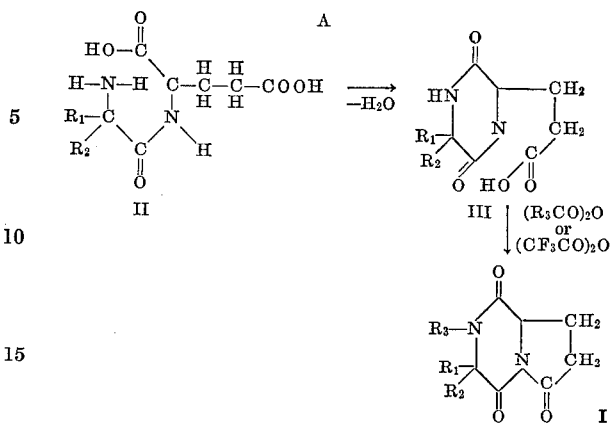

An α-aminoalkanoyl-L-glutamic acid (Formula II) is heated to a temperature sufficient to cyclize the carbon of the carboxyl group with the nitrogen of the amino function, as shown, to form a 3,6-dioxo-2-piperazine-propionic acid (Formula III). Heating to temperatures of about 150°–160° C. has by experience been shown to be quite sufficient to induce reaction. The 3,6-dioxo-2-piperazine-propionic acid is then treated with a cyclizing agent such as trifluoracetic anhydride to form those compounds of this invention having $R_3$=H (Formula I). This is done by creating a bond between the carbon of the carboxyl group and the hydrogen of the amido group. The N-alkanoyl derivatives, i.e. $R_3$=alkanoyl, can be prepared by either refluxing the compounds of Formula IV with an acid anhydride other than trifluoroacetic anhydride or by using such an acid anhydride as the cyclizing agent for the 3,6-dioxo-2-piperazine-propionic acids.

A second preparative scheme, scheme B, somewhat different from scheme A, can also be used to prepare the novel compounds of this invention. The reactive steps of this second procedure are as follows:

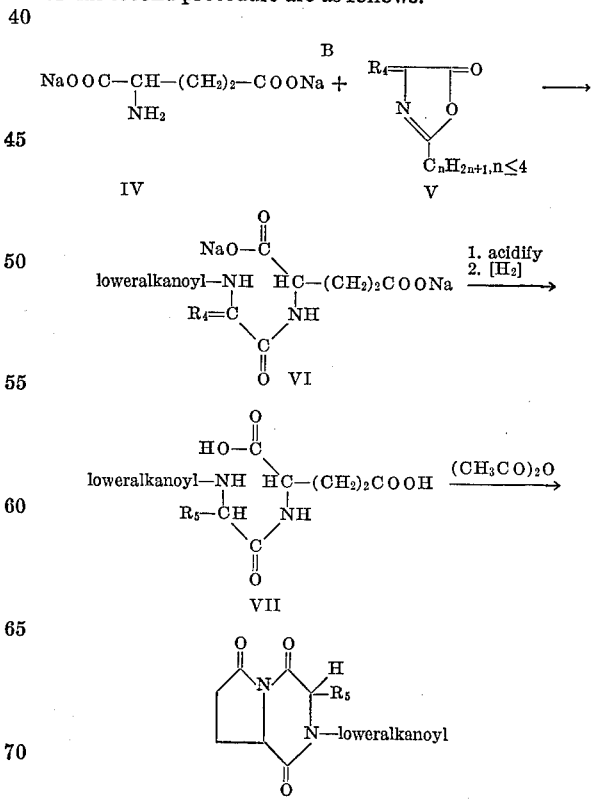

In reaction scheme B, the disodium salt of glutamic acid (Formula IV) is added to an unsaturated azalactone (Formula V), in which $R_4$ represents benzylidene, mono-loweralkoxybenzylidene, diloweralkoxybenzylidene, tri-loweralkoxybenzylidene or 3,4-cyclomethylenedioxybenzylidene. The addition results in an α-loweralkanoyl-amidocinnamoyl-glutamic acid (Formula VI). The unsaturated bond between $R_4$ and the α carbonyl carbon is reduced by means such as reduction with hydrogen over a hydrogenation catalyst such as, for example, palladium.

This reduction yields the corresponding N-lower-alkanoyl-α-amino-loweralkanoyl-glutamic acid (Formula VII) which can then be cyclized with an acid anhydride. $R_5$ is a subclass of $R_1$ and represents the benzyl, mono-alkoxybenzyl, dialkoxybenzyl, trialkoxybenzyl or cyclo-loweralkylenedioxybenzyl groups.

To those skilled in the art, it is apparent from the structure of generic Formula I that there can exist stereoisomers of the compounds represented by this formula. The individual stereoisomers and racemic mixtures can be made by varying the configuration, i.e., D or L or DL, of the starting material, and thus the configuration of the $R_1$ and $R_2$ on the asymmetric carbon atom. Therefore, various stereoisomers and the corresponding variety of racemic mixtures are included within the scope of this invention.

The compounds of this invention can be prepared and administered in a wide variety of oral and intraperitoneal dosage forms, either separately, in combination, or admixed with other drugs. The pharmaceutically active material may be associated with a carrier if desired, and the admixture of drug and carrier may comprise a solid; or be a liquid solution, dispersion or suspension. The solid dosage form can take the form of a tablet, a powder, a capsule or the like, while the liquid dosage form can be a syrup, a suspension, an emulsion, an elixer, or the like. Those conventional carriers so well known in the art such as starch, sucrose, ethanol, glycerin and the like may thus be used.

Although the compounds of this invention can be administered in any of the stated physical forms with the stated carriers, the preferred form and carrier is a 1–3% by weight of aqueous suspension. When given thusly, a small amount of tragacanth can be added to facilitate formation of a uniform suspension in those instances where suspension is otherwise difficult to achieve. Sufficient tragacanth to form a good suspension was found to comprise about 3% by weight of the liquid phase.

When administered by oral or intraperitoneal routes in dosages of a range from 0.1 to 1,000 mg./kg. body weight to laboratory animals, those compounds having either hydrogen or acetyl in the $R_3$ position, and having the substituents in the $R_1$ and $R_2$ position, be either both hydrogen or ethyl and methyl, show stimulative effects to the central nervous system. In the instance of every other compound a generalized and nonselective depressant action on the central nervous system of the animal was observed. Illustrative of these compounds' effect is the data given in the following table showing the effect upon laboratory mice at the specified dosages:

| $R_1$ | $R_2$ | $R_3$ | Oral | Intraperitoneal | Effect |
|---|---|---|---|---|---|
| Hydrogen | Hydrogen | Hydrogen | 0.1–1,000 | 0.1–1,000 | Stimulant. |
| Methyl | do | do | 200–500 | 100–500 | Depressant. |
| Do | Methyl | do | | 590 | Do. |
| Isopropyl | Hydrogen | do | 500–1,000 | 200–1,000 | Do. |
| Hydrogen | Benzyl | do | 500–1,000 | 500–1,000 | Do. |
| Ethyl | Methyl | do | | 200–500 | Stimulant. |
| Do | do | Acetyl | 500–1,000 | 200–1,000 | Do. |
| Hydrogen | Hydrogen | do | 0.1–100 | 0.1–10 | Do. |
| Do | do | do | 200 | 50 | Depressant. |
| Methyl | do | do | 1,000 | 500–1,000 | Do. |
| Do | Methyl | do | 100–1,000 | 100–1,000 | Do. |
| Isopropyl | Hydrogen | do | 500–1,000 | 500–1,000 | Do. |
| Hydrogen | Benzyl | do | | 1,000 | Do. |
| Do | Hydrogen | Propionyl | 100–1,000 | 50–1,000 | Do. |
| Do | do | Butyryl | 500–1,000 | 100–1,000 | Do. |
| Do | do | Isobutyryl | 200–1,000 | 500–1,000 | Do. |
| Do | 4-methoxybenzyl | Acetyl | 500–1,000 | 100–1,000 | Do. |
| Do | 3,4-dimethoxybenzyl | do | 500–1,000 | 200–1,000 | Do. |
| Do | 3,4,5-trimethoxybenzyl | do | 200–1,000 | 100–1,000 | Do. |
| Do | 3,4-cyclomethylene-dioxybenzyl | do | 500–1,000 | 200–1,000 | Do. |

The following specific examples are further illustrative of this invention, including aspects of the compounds themselves, and methods of preparing them. These examples are only for purposes of illustration and ought not be construed as an expressed or implied limitation upon the scope of the appended claims, and are not intended as limiting the concept of the invention in any manner.

EXAMPLE I 1,4-diaza-bicyclo [4,3,0] nonane-2,5,9-trione

Glycyl-L-glutamic acid was heated at a pressure of 1 mm. of mercury to a temperature of 150°–160° C. for about 30 minutes. The resulting 3,6-dioxo-2 piperazine-propionic acid (2.0 g.) was refluxed for one hour with 20 ml. of trifluoroacetic anhydride. The solution was then cooled and concentrated at reduced pressure to a syrup that after treating with 10 ml. ether gave a 1.86 g. of a pale yellow solid. This solid was then dissolved in 10 ml. ethanol and precipitated with 25 ml. ether. The purified product was then filtered and dried. It had a melting point of 184–7° C., and a yield of 79% based upon the glycyl-L-glutamic acid. The identity of this product, as was the identity of the products of the following examples was confirmed by elemental analysis and infra-red and NMR spectroscopy. The calculated values for a compound having the empirical formula $C_7H_8N_2O_3$ are carbon 50.0%, hydrogen 4.8%, and nitrogen 16.7%. Elemental analysis showed this product to contain 50.2%, 4.7%, 16.8% respectively of these elements.

EXAMPLE II

Levo-3-methyl-1,4-diaza-bicyclo [4,3,0] nonane-2,5,9-trione

The procedure was the same as in Example I, except the starting material was L-alanyl-L-glutamic acid and the recrystallization solvent was ethanol. The product was obtained in 72% yield and had a melting point of 220–222° C. Analysis showed that the product contained 52.5% carbon, 5.5% hydrogen and 15.4% nitrogen. The calculated values for $C_8H_{10}N_2O_3$ are 52.7%, 5.5% and 15.4% respectively.

EXAMPLE III 3-methyl-1,4-diaza-bicyclo [4,3,0] nonane-2,5,9-trione

The procedure was the same as in Example I, except the starting material was DL-alanyl-L glutamic acid and the recrystallization solvent was ethanol. The product was obtained in 68% yield and had a melting point of 187–191° C. and elemental analysis showed that the product contained 52.8% carbon, 5.4% hydrogen and 15.6% nitrogen. The calculated values for $C_8H_{10}N_2O_3$ are 52.7%, 5.5% and 15.4% respectively.

EXAMPLE IV 3,3-dimethyl-1,4-diaza-bicyclo[4,3,0]nonane-2,5,9-trione

The procedure was the same as stated in Example I, except the starting material was α-aminoisobutyryl-L-glutamic acid and the recrystallization solvent was ethanol-ether. The product was obtained in 77% yield and had a melting point of 258–261° C. Elemental analysis showed that the product contained 54.9% carbon, 6.5% hydrogen and 14.3% nitrogen. The calculated values for $C_9H_{12}N_2O_3$ are 55.1%, 6.2%, and 14.3% respectively.

EXAMPLE V 3-iso-propyl-1,4-diaza-bicyclo[4,3,0]nonane-2,5,9-trione

The procedure was the same as in Example I, except the starting material was DL-valyl-L-glutamic acid and the recrystallization solvent was ethanol. The product was obtained in 19% yield and had a melting point of 190–220° C. Elemental analysis showed that the product contained 57.2% carbon, 6.7% hydrogen and 13.2% nitrogen. The calculated values for $C_{10}H_{14}N_2O_3$ are 57.1%, 6.7%, and 13.3% respectively.

EXAMPLE VI

Levo-3-isobutyl-1,4-diaza-bicyclo[4,3,0]nonane-2,5,9-trione

The procedure was the same as in Example I, except the starting material was L-leucyl-L-glutamic acid and the recrystallization solvent was ethanol. The product was obtained in 23% yield and had a melting point of 215–218° C. Elemental analysis shrowed that the product contained 59.0% carbon, 7.2% hydrogen and 12.6% nitrogen. The calculated values for $C_{11}H_{16}N_2O_3$ are 58.9%, 7.2% and 12.5% respectively.

EXAMPLE VII

Levo-3-benzyl-1,4-diaza-bicyclo[4,3,0]nonane-2,5,9-trione

The procedure was the same as in Example I, except the starting material was L-phenylalanyl-L-glutamic acid and the recrystallization solvent was a mixture of methanol and ether. The product was obtained in 57% yield and had a melting point of 192–194° C. Elemental analysis showed that the product contained 64.8% carbon, 5.7% hydrogen and 11.0% nitrogen. The calculated values for $C_{14}H_{14}N_2O_3$ are 65.1%, 5.5% and 10.9% respectively.

EXAMPLE VIII

Dextro-3-benzyl-1,4-diaza-bicyclo[4,3,0]nonane-2,5,9-trione

The procedure was the same as in Example I, except the starting material was D-phenylalanyl-L-glutamic acid and the recrystallization solvent was ethanol. The product was obtained in 69% yield and had a melting point of 196–198° C. Elemental analysis showed that the product contained 65.1% carbon, 5.4% hydrogen and 10.9% nitrogen. The calculated values for $C_{14}H_{14}N_2O_3$ are 65.1%, 5.5%, and 10.9% respectively.

EXAMPLE IX 3-ethyl-3-methyl-1,4-diaza-bicyclo[4,3,0]nonane-2,5,9-trione

DL-isovalyl-L-glutamic acid was heated at a pressure of 1 mm. Hg. The resulting 3-ethyl-3-methyl-3,6-dioxo-2-piperazine propionic acid (2.0 g.) was refluxed for one hour with acetic anhydride. After refluxing was completed the solution was cooled and concentrated at reduced pressure to a syrup, which a treatment with 10 ml. ether yielded (1.52 g.) of a buff colored solid. This solid was recrystallized from acetone (15 ml.), and yielded 0.48 g. (28% yield) of product having a melting point of 222–5° C.

*Analysis.*—Calc'd for $C_{10}H_{14}N_2O_3$: 57% carbon, 6.7% hydrogen and 13.3% nitrogen. Found: 57.2%; 6.6% and 13.1% respectively.

EXAMPLE X 3-ethyl-3-methyl-4-acetyl-1,4-diaza-bicyclo[4,3,0]nonane-2,5,9-trione The supernatant acetone solution from Example IX was concentrated at reduced pressure and 0.59 g. of a water insoluble solid obtained. This solid was washed with 15 ml. water, filtered and twice again washed. When dry, it gave a 26% (0.54 g.) yield to the product having a melting point 129–131° C.

*Analysis.*—Calc'd for $C_{12}H_{16}N_2O_4$: 57.1% carbon, 6.4% hydrogen, 11.1% nitrogen. Found: 57.4%, 6.5% and 11.2% respectively.

EXAMPLE XI 4-acetyl-1,4-diaza-bicyclo[4,3,0]nonane-2,5,9-trione

This compound was prepared in the same manner as Example I except acetic anhydride was substituted for trifluoroacetic anhydride. Reaction of glycyl-L-glutamic acid gave a 78% yield of product having a melting point of 148–150° C.

*Analysis.*—Calc'd for $C_9H_{10}N_2O_4$: 51.4% carbon; 4.8% hydrogen and 13.3% nitrogen. Found: 51.7%, 4.9%, and 13.6% respectively.

EXAMPLE XII 3-methyl-4-acetyl-1,4-diaza-bicyclo[4,3,0]nonane-2,5,9-trione

This compound was prepared in the same manner as Example II except acetic anhydride was substituted for trifluoroacetic anhydride. Reaction of L-alanyl-L-glutamic acid gave a 48% yield of product having a melting point of 183–185° C.

*Analysis.*—Calc'd for $C_{10}H_{12}N_2O_4$: 53.6% carbon, 5.4% hydrogen and 12.5% nitrogen. Found: 53.7%, 5.2%, and 12.7% respectively.

EXAMPLE XIII 3,3-dimethyl-4-acetyl-1,4-diaza-bicyclo[4,3,0]nonane-2,5,9-trione This compound was prepared in the same manner as Example IV except acetic anhydride was substituted for trifluoroacetic anhydride. Reaction of α-amino-isobutyryl-L-glutamic acid gave a 47% yiel,d of product having a melting point of 163–166° C.

*Analysis.*—Calc'd for $C_{11}H_{14}N_2O_4$: 55.5% carbon; 5.9% hydrogen and 11.8% nitrogen. Found: 55.6%, 6.2% and 11.7% respectively.

EXAMPLE XIV 3-isopropyl-4-acetyl-1,4-diaza-bicyclo[4,3,0]nonane-2,5,9-trione This compound was prepared in the same manner as Example V except acetic anhydride was substituted for trifluoroacetic anhydride. Reaction of DL-valyl-L-glutamic acid gave a 63% yield of product having a melting point of 178–180° C.

*Analysis.*—Calc'd for $C_{12}H_{16}N_2O_4$: 57.1% carbon 6.4% hydrogen and 11.1% nitrogen. Found: 56.9% 6.2% and 11.0% respectively.

EXAMPLE XV 3-isobutyl-4-acetyl-1,4-diaza-bicyclo[4,3,0]nonane-2,5,9-trione

This compound was prepared in the same manner as Example VI except acetic anhydride was substituted for trifluoroacetic anhydride. Reaction of L-leucyl-L-glutamic acid gave a 32% yield of product having a melting point of 158°–160° C.

*Analysis.*—Calc'd for $C_{13}H_{18}N_2O_4$: 58.6% carbon, 6.8% hydrogen and 10.5% nitrogen. Found: 58.6%, 6.9% and 10.5% respectively.

EXAMPLE XVI 3-benzyl-4-acetyl-1,4-diaza-bicyclo [4,3,0] nonane-2,5,9-trione

This compound was prepared in the same manner as Example VII except acetic anhydride was substituted for trifluoroacetic anhydride. Reaction of L-phenylalanyl-L-glutamic acid gave a 63% yield of product having a melting point of 164–166° C.

*Analysis.*—Calc'd for $C_{16}H_{16}N_2O_4$: 64.0% carbon, 5.4% hydrogen and 9.3% nitrogen. Found: 64.1%, 5.4% and 9.5% respectively.

EXAMPLE XVII 4-propionyl-1,4-diaza-bicyclo [4,3,0] nonane-2,5,9-trione

This compound was prepared by the method set forth in Example I excepting that the intermediate 3,6-dioxo-2-piperazine-propionic acid was refluxed with a 1:1 by volume mixture of dimethylformamide and propionic anhydride. The product, in 66% yield, had a melting point of 158–160° C. after recrystallization from an ethanol-ether mixture. The empirical formula for this product is $C_{10}H_{12}N_2O_4$, and percentages calculated from the formula are 53.6% carbon, 5.4% hydrogen and 12.5% nitrogen. Elemental analysis of the product showed it contained 53.9%, 5.7% and 12.7% respectively of these elements.

EXAMPLE XVIII 4-butyryl-1,4-diaza-bicyclo [4,3,0] nonane-2,5,9-trione

This compound was prepared as was the compound of Example XVII except that a 1:1 by volume mixture of dimethylformamide and butyric anhydride was refluxed with the 3,6-dioxo-2-piperazine-propionic acid intermediate. The product was obtained in 36% yield, and had a melting point of 121–123° C. after recrystallization from an acetone-ether mixture. The empirical formula for this product is $C_{11}H_{14}N_2O_4$, and the percentages calculated from this formula are 55.5% carbon, 5.9% hydrogen, and 11.8% nitrogen. Elemental analysis of the product showed it contained 55.3%, 6.2% and 11.7% respectively of these elements.

EXAMPLE XIX 4-isobutyryl-1,4-diaza-bicyclo [4,3,0] nonane-2,5,9-trione

This compound was prepared as was the compound in Example XVII except that a 1:1 by volume mixture of dimethylformamide and isobutyric anhydride was refluxed with the 3,6-dioxo-2-piperazine-propionic acid intermediate. The product was obtained in 25% yield, and had a melting point of 148–50° after recrystallization from a benzene-ether mixture. The empirical formula for this product is $C_{11}H_{14}N_2O_4$, and the percentages calculated from this formula are 55.5% carbon, 5.9% hydrogen, and 11.8% nitrogen. Elemental analysis of the product showed it contained 55.3%, 5.7% and 11.7% of these elements respectively.

EXAMPLE XX 3-(4-methoxybenzyl)-4-acetyl-1,4-diaza-bicyclo [4,3,0] nonane-2,5,9-trione This compound was prepared by stirring 600 ml. of 1N NaOH into a 300 ml. acetone suspension of 44.1 g. L-glutamic acid. Shortly thereafter 65.2 g. 2-methyl-4-anisylidene-2-oxazolin-5-one was added. After additional stirring for 3 hours all the oxazolin had dissolved, and the solution was acidified with 600 ml. 1N HCl. The solution was then concentrated at reduced pressure to remove the acetone. Following overnight storage at 5° C. the crude α-acetamido-4-methoxycinnamoyl-L-glutamic acid was filtered and recrystallized from isopropanol in a 74% yield having a melting point of 189–191° C.

The α-acetamido-4-methoxycinnamoyl-L-glutamic acid (50 g.) was then hydrogenated in 250 ml. of glacial acetic acid at 60° C. and 2.7 atmospheres pressure in the presence of 7.5 g. of a 5% palladium on carbon catalyst. Reaction was judged to have been completed after one hour, but to insure completeness the hydrogenation was continued for an additional hour. The catalyst was then removed by filtration and the filtrate concentrated at reduced pressure. The last traces of acetic acid were removed from the white solid N-acetyl-DL-3-(4-methoxyphenyl)-alanyl-DL-glutamic acid at 50° C. and a pressure of 1 mm. of mercury for 40 hours. This method was used to prepare the N-acyl-α-ammoacyl-glutamic acids in the following examples.

The N-acetyl-DL-3-(4-methoxyphenyl)-alanyl-DL-glutamic acid was then refluxed with 50 ml. acetic anhydride for one hour. The solution was concentrated at reduced pressure and a white solid obtained. Recrystallization from ethyl acetate-petroleum spirit mixture gave 55% yield of product having a melting point 168–169° C. The empirical formula is $C_{17}H_{18}N_2O_5$, the calculated value being 61.8% carbon, 5.5% hydrogen, and 8.5% nitrogen. Elemental analysis showed the product to contain 61.7%, 5.7% and 8.4% of these elements respectively.

Stereoisomers of this product were obtained by also using the D and L forms of the glutamic acid.

EXAMPLE XXI 3-benzyl-4-acetyl-1,4-diaza-bicyclo [4,3,0] nonane-2,5,9-trione

N-acetyl-DL-phenylalanyl-DL-glutamic acid was refluxed with acetic anhydride for one hour and recrystallization of the product from an ethyl acetate-petroleum spirit mixture gave a 49% yield having a melting point of 162–164° C. The empirical formula is $C_{16}H_{16}N_2O_4$ and by calculation contains 64.0% carbon, 5.4% hydrogen, and 9.3% nitrogen. Elemental analysis of the product showed it contained 64.2%, 5.4%, 9.2% of those elements respectively.

EXAMPLE XXII 3-(3,4-dimethoxybenzyl)-4-acetyl-1,4-diaza-bicyclo [4,3,0] nonane-2,5,9-trione N-acetyl-DL-3,4-dimethoxyphenyl alanyl-DL-glutamic acid was refluxed with acetic anhydride. The resulting product, recrystallized from an ethyl acetate-petroleum spirit mixture was obtained in 42% yield having a melting point 172–173° C. The empirical formula is $C_{18}H_{20}N_2O_6$, the calculated value being 60.0% carbon, 5.6% hydrogen and 7.8% nitrogen. Elemental analysis showed the product contained 60.2%, 5.7% and 7.8% of these elements respectively.

EXAMPLE XXIII 3-(3,4,5-trimethoxybenzyl)-4-acetyl-1,4-diaza-bicyclo [4,3,0] nonane-2,5,9-trione N-acetyl-DL-3,4,5-trimethoxyphenylalanyl-DL-glutamic acid was refluxed with acetic anhydride. The resulting product, recrystallized from ethyl acetate was obtained in a 40% yield having a melting point of 162–164° C. The empirical formula is $C_{19}H_2N_2O_7$, the calculated value being 58.5% carbon, 5.7% hydrogen and 7.2% nitrogen. Elemental analysis showed the product contained 58.7%, 5.7% and 7.1% of those elements respectively.

EXAMPLE XXIV 3-(3,4-cyclomethylenedioxybenzyl)-4-acetyl-1,4-diazabicyclo [4,3,0] nonane-2,5,9-trione N-acetyl-DL-3,4-methylenedioxyphenylalanyl-DL-glutamic acid was refluxed with acetic anhydride. The resulting product, recrystallized from ethyl acetate, was obtained in 42% yield having a melting point of 172–174° C. The empirical formula is $C_{17}H_{16}N_2O_6$, the calculated value being 59.3% carbon, 4.7% hydrogen and 8.1% nitrogen. Elemental analysis showed the product to contain 59.2%, 4.4% and 8.1% of those elements respectively.

I claim:
1. A compound of the formula

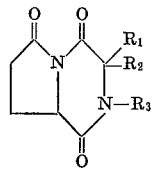

wherein $R_1$ is hydrogen methyl, ethyl, propyl, isopropyl, and n-butyl; $R_2$ is hydrogen, methyl, ethyl, propyl, isopropyl, n-butyl, benzyl, monoloweralkoxy benzyl, diloweralkoxy benzyl, triloweralkoxy benzyl, and 3,4-cyclomethylene-dioxybenzyl, and $R_3$ is hydrogen and loweralkanoyl.

2. A compound in accordance with claim 1 in which $R_1$, $R_2$ and $R_3$ are hydrogen.

3. A compound in accordance with claim 1 in which $R_1$ and $R_2$ are hydrogen and $R_3$ is loweralkanoyl.

4. A compound in accordance with claim 1 in which $R_1$ and $R_3$ are hydrogen and $R_2$ is loweralkyl.

5. A compound in accordance with claim 1 in which $R_1$ and $R_2$ are hydrogen.

6. A compound according to claim 1 in which $R_1$ is methyl, ethyl, propyl, isopropyl and n-butyl and $R_3$ is hydrogen.

7. A compound according to claim 1 in which $R_1$ is methyl, ethyl, propyl, isopropyl and n-butyl and $R_3$ is loweralkanoyl.

8. A compound according to claim 1 in which $R_1$ and $R_3$ are hydrogen.

9. A compound according to claim 1 in which $R_1$ is hydrogen and $R_3$ is lower alkanoyl.

References Cited

UNITED STATES PATENTS

| | | | |
|---|---|---|---|
| 3,227,719 | 1/1966 | Hofmann | 260—268 |
| 3,317,524 | 5/1967 | Freed | 260—268X |
| 3,388,128 | 6/1968 | Day | 260—268 |

FOREIGN PATENTS 19,431  10/1966  Japan.

DONALD G. DAUS, Primary Examiner

U.S. Cl. X.R.

260—307, 534, 690; 424—250

PO-1050
(5/69)

UNITED STATES PATENT OFFICE
CERTIFICATE OF CORRECTION

Patent No. 3,563,992        Dated  Feb. 16, 1971

Inventor(s)  Michael R. Harnden

It is certified that error appears in the above-identified patent and that said Letters Patent are hereby corrected as shown below:

Column 2, in Formula III, the structural formula should appear as shown below instead of as shown in the patent

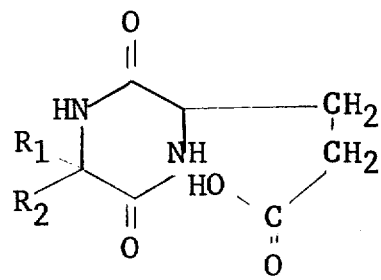

Column 5, Example VI, line 7, the word "shrowed" should read --showed--.

Column 6, Example XIII, line 6, the word "yiel,d" should read --yield--.

Column 8, Example XXIII, line 7, the empirical formula should read as

-- $C_{19}H_{22}N_2O_7$ --        instead of as shown in the patent.

Signed and sealed this 29th day of June 1971.

(SEAL)
Attest:

EDWARD M. FLETCHER, JR.
Attesting Officer

WILLIAM E. SCHUYLER, JR.
Commissioner of Patents